May 3, 1932.  W. N. BOOTH  1,856,237
MACHINE FOR RIVETING SPOKES OF VEHICLE WIRE WHEELS
Original Filed July 11, 1927   3 Sheets-Sheet 1

Inventor
William N. Booth
By Whittemore Hulbert Whittemore Belknap
Attorneys

Patented May 3, 1932

1,856,237

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

MACHINE FOR RIVETING SPOKES OF VEHICLE WIRE WHEELS

Application filed July 11, 1927, Serial No. 204,980. Renewed October 9, 1930.

The invention relates to a riveting machine and refers more particularly to a machine for riveting the spokes of vehicle wire wheels. One of the objects of the invention is to so construct the machine that the hub and rim members of the wheel will be held in predetermined relation to each other while the spokes of the wheel are being riveted. Another object is to provide a simple indexing mechanism for successively advancing corresponding spokes of the wheel to a position to be riveted. Further objects of the invention reside in the novel features of construction and combinations and arrangements of parts as more fully hereinafter set forth.

In the drawings:—

Figure 4 is a cross section on the line 4—4 of Figure 3;

Figure 5 is a rear elevation thereof, partly broken away and partly in section.

Figure 1:
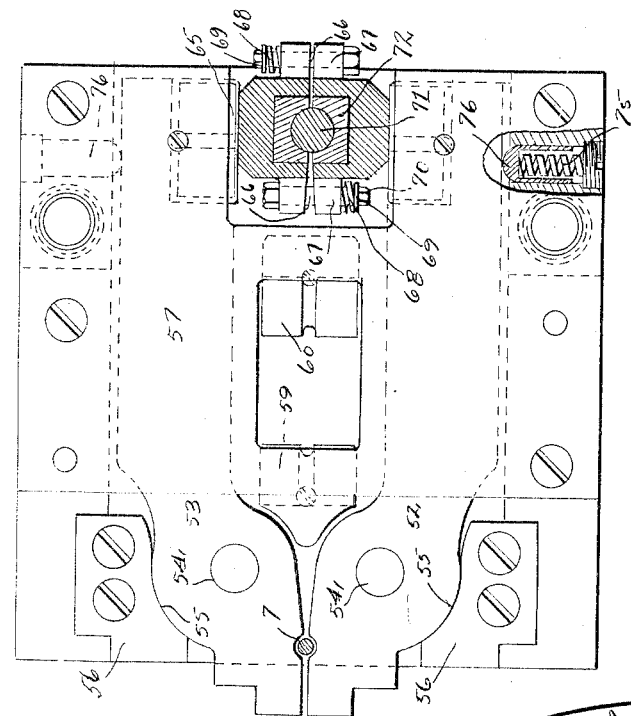
Figure 1 is a front elevation of a machine embodying my invention.
Figure 2:
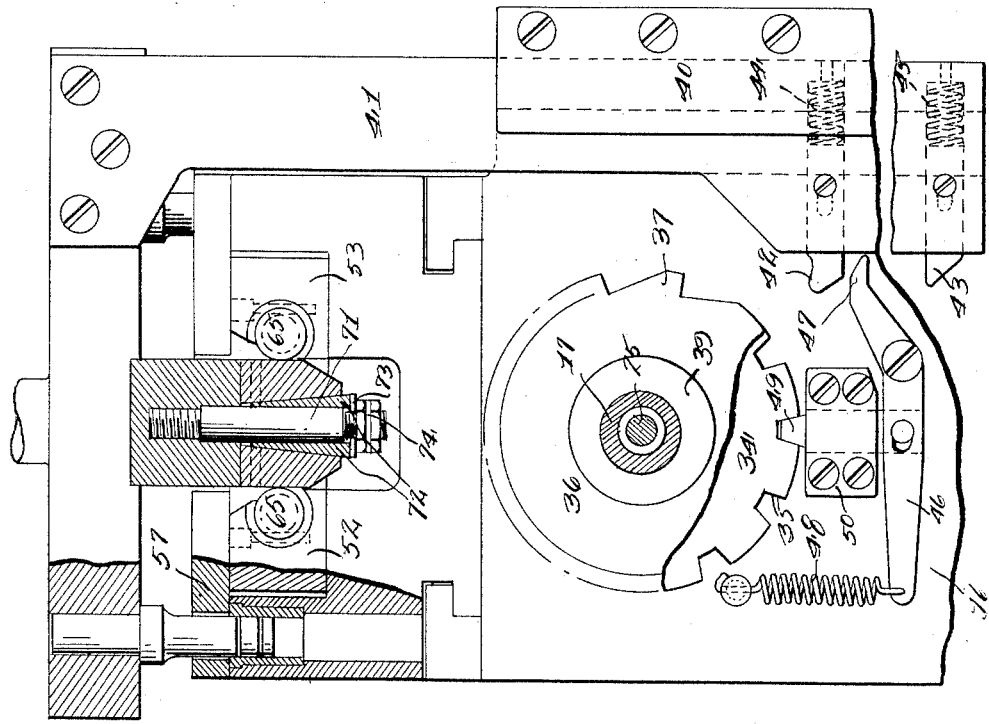
Figure 2 is a plan view thereof.
Figure 3:
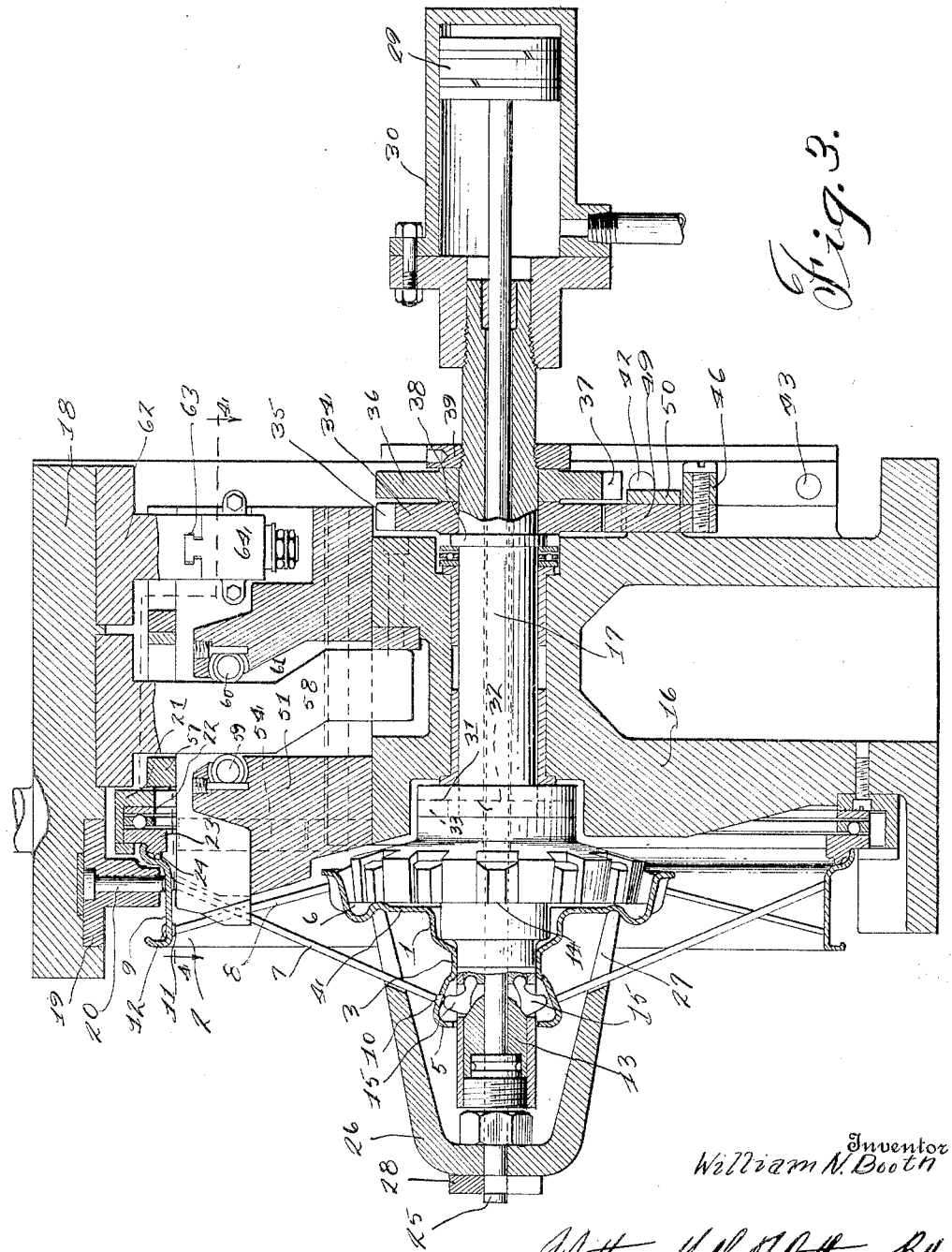
Figure 3 is a cross section on the line 3—3 of Figure 1.

In general, the riveting machine embodying my invention is designed to rivet the outer ends of wire spokes of a vehicle wire wheel to the rim member. The wire wheel in the present instance has the hub member 1 in the nature of a sheet metal hub shell and the rim member 2 in the nature of a sheet metal tire carrying rim of the solid base type. The hub shell has the barrel section 3 and the flange section 4, the former being provided at its front end with the annular bead 5 and the latter being provided at its outer edge with the rearwardly extending annular flange 6. In the completed wire wheel, front and rear spokes connect the hub and rim members, the front spokes extending from the bead 5 of the hub shell to the rear edge of the base 9 of the rim member and the rear spokes extending from the annular flange 6 of the hub shell to the front edge of the base of the rim member. The rear spokes are arranged in pairs with the spokes of each pair crossing intermediate their ends. while the front spokes extend between adjacent pairs of the rear spokes.

In the present instance the riveting machine operates upon the front spokes 7 of the wheel assembly, the rear spokes having already been secured. These front spokes have the hemi-spherical heads 10 at their inner ends for engaging hemi-spherical seats in the annular bead 5 and the enlargements 11 and the tenons 12 at their outer ends, the tenons having their axes inclined to the axes of the spokes to extend radially through the base 9 of the rim member and the enlargements forming annular shoulders surrounding the tenons for engaging the base. The hemi-spherical shoulders formed by the heads and the shoulders formed by the enlargements are at fixed distances apart so that when they engage the hub shell and the rim member they assure concentricity of these parts. The front spokes are placed in the wheel assembly prior to this wheel assembly being inserted in the riveting machine. In detail, these front spokes are passed outwardly through the annular bead 5 and their tenons are properly engaged with the rim member 2. Then the front section 13 of a spoke holding chuck is inserted into the barrel section of the hub shell from its front end and suitably secured to the rear section 14 of this chuck, which served to clamp the heads at the inner ends of the rear spokes 8 to the annular flange 6 while the tenons at the outer ends of these rear spokes were being riveted. After the front section has been assembled with the rear section, the arms 15 are forced outwardly into contact with the heads 10 of the front spokes to clamp the hemi-spherical shoulders formed by these heads firmly against their seats in the annular bead 5.

16 is the base of the riveting machine, in which is journaled the horizontal shaft 17, which extends through both the front and rear sides of the base and has the wheel assembly, including the complete spoke holding chuck mounted upon its front end. 18 is a vertically reciprocable holder above the base 16 and adapted to be carried by a suitable vertically reciprocable ram. This holder has secured to its lower face near its front edge the punch block 19, which secures the riveting punch 20 to the holder. 21 is a thrust ring holder which is secured to the front side of the base 16 and carries the anti-friction bearing 22, the front race 23 of which forms an abutment for the rear tire retaining flange of the rim member 2 and positions this rim member so that the tenons 12 of the front spokes may register with the punch 20 which is constructed to first split the outer ends of these tenons and then head the same over against the outer face of the base 9 of the rim member. The abutment 23 is provided upon its front face with the annular projections 24 for contacting with the rear tire retaining flange of the rim member adjacent to its base.

To clamp the shoulders formed by the enlargements 11 of the spokes against the inner face of the base 9 of the rim member prior to riveting their tenons, the hub shell with the spoke holding chuck is moved rearwardly to a predetermined position by the draw bar 25 which extends axially through the shaft 17, the clamp 26 sleeved upon the front section 13 of the chuck and having the spaced arms 27 embracing the front spokes 7 and abutting the flange section 4 of the hub shell, and the washer 28 abutting the clamp and having bifurcations engaging in grooves in the opposite sides of the draw bar. The rear end of the draw bar is connected to the piston 29 within the cylinder 30 and a suitable medium such as compressed air may be used for moving this piston within the cylinder. For limiting the rearward movement of the hub shell there is the abutment 31 which is sleeved upon the shaft 17 adjacent to the front side of the base 16. The portion of the shaft upon which the abutment is sleeved preferably has its opposite sides flatted and the opening through the abutment is correspondingly shaped so that upon rotation of the shaft the abutment also rotates. The abutment has in its front face the aligned radial grooves 32 into which the projections 33 upon the rear chuck section 14 extend so that the abutment drives the spoke holding chuck and consequently the wheel assembly.

To index the wheel assembly and advance the front spokes successively to a position registering with the riveting punch 20, I have provided mechanism which is actuated upon the reciprocation of the holder 18. In detail, 34 is an index disk having the notches 35 in its periphery, these notches being equidistant and their number corresponding to the number of front spokes. These notches also preferably have inwardly converging sides. 36 is a ratchet disk having the teeth 37 at its periphery providing contact shoulders facing in a clockwise direction. These two disks are secured upon the shaft 17 at the rear side of the base 16 between the annular collar 38 preferably formed integral with the shaft and the nut 39 threaded upon the shaft. Furthermore, the two disks are secured to the shaft to rotate the same, these disks having in the present instance polygonal openings for engaging a polygonal portion of the shaft. 40 is a gib secured to the rear side of the base 16 and 41 is a slide secured to and depending from the holder 18 adjacent to an edge of the disks and engaging the gib. This slide carries the upper and lower longitudinally reciprocable plungers 42 and 43, respectively, which extend transversely thereof and are yieldably forced in a direction toward the disks by the coil springs 44 and 45. 46 is a lever pivotally mounted upon the base 16 at its rear side and below the disks, this lever having the nose 47 extending to a postiion engageable by the nose of the plunger 43, the opposite end of the lever being connected to the coil spring 48 for normally forcing the plunger 49 upwardly and into engagement with the index disk 34, this plunger being pivotally connected at its lower end to the lever at the same side of the pivot for the lever as the coil spring and being guided by the plate 50. The nose at the upper end of the plunger 49 is shaped to fit in a notch 35 and thereby exactly position the index disk 34 and consequently exactly position the wheel assembly. The arrangement is such that upon upward movement of the ram and the holder 18, the plunger first engages the nose 37 of the lever 46 to swing this lever and thereby withdraw the plunger 49 out of a notch 35 of the index disk 34. The plunger remains in engagement with the nose 47 a sufficient time so that upon further upward movement of the ram and holder the plunger 42 may engage the shoulder formed by a tooth 37 of the ratchet disk 36 and advance this ratchet disk to its next approximate rotative position of adjustment, after which the plunger 43 becomes disengaged from the nose 47 of the lever and allows the coil spring to function to return the lever of the plunger 49 to engage the nose of the plunger in the succeeding notch 35 to exactly position the index disk.

To prevent bending of the spokes while they are being riveted and at the same time to hold the shoulders formed by the enlargements 11 upon the spokes against the inner face of the base 9 of the rim member during the riveting, I have provided the die shoe 51 which is slidably mounted upon the base 16 above the shaft 17 and clears the index and ratchet disks. This die shoe is reciprocable toward and away from the wheel assembly and carries the spoke gripping jaws 52 and 53 having cooperating front ends provided with registering grooves inclined and also shaped to engage the portions of the front spokes, including their enlargements for a substantial length inwardly from the base of the rim member. These jaws are pivotally connected to the die shoe by the pins 54 located near the front ends of the jaws and to relieve these pins from shearing stress, the portions of the jaws opposite the pins are curved at 55 concentrically with the axes of the pins to engage the bearing blocks 56 which are secured to the die shoe. 57 is a cover plate secured to the die shoe above the jaws for holding the latter from upward movement relative to the die shoe.

To reciprocate the die shoe to carry the spoke gripping jaws forwardly to a position to engage the front spoke or rearwardly to a position to clear both the front and rear spokes and permit indexing of the wheel assembly, there is the cam 58 which is secured to and depends from the holder 18, the front and rear sides of this cam being engageable with the rolls 59 and 60, respectively, mounted at the front and rear of the opening 61 through the die shoe, this opening permitting the passage of the cam therethrough upon the downward movement of the holder.

To swing the spoke gripping jaws to clamp a front spoke, there is the cam holder 62 which is secured to and depends from the holder 18 in rear of the cam 58. This cam holder has in its lower end the diametrically extending T-shaped slot 63 loosely engaged by T-shaped heads upon the cams 64 which are engageable with the rolls 65 upon the jaws 52 and 53 and extending longitudinally thereof along their inner sides at their rear ends. 66 are bolts extending through the flanges 67 upon the cams and 68 are coil springs encircling the bolts and located between the flanges of the cams and the washers 69, which latter are held in place by nuts 70 threaded upon the bolts. 71 is a bolt threaded axially into the lower end of the cam holder 62 and 72 are wedges encircling the bolt and engaging in grooves extending longitudinally or vertically in the inner portions of the cams, there being a wedge for each cam. 73 is a washer for abutting the lower ends of the wedges and 74 is a nut threaded upon the bolt and contacting with the washer for moving the same longitudinally of the bolt and thereby correspondingly moving the wedges to vary the distance between the cams and thereby assure tight gripping of the spokes by the jaws 52 and 53 upon downward movement of the cams. To provide for an extended contact between the cam faces of the cams and the rolls 65 at all times, the clearance between the inner flanges 67 of the cams and the inner portions of the wedges progressively increase away from the bolts 71 so that the cams with their respective wedges may swing about the bolt upon swinging of the spoke gripping jaws. To maintain the spoke gripping jaws normally in open position, there are the coil springs 75 which yieldably force the plunger 76 inwardly and transversely of the die shoe 51 and against the outer sides of the spoke gripping jaws near their rear ends.

With the holder 18 in raised position and the plunger 49 engaging a notch 35 of the index disk 34, a wheel assembly, including the hub shell 1, the rim 2, the rear spokes 8, the front spokes 7 and the spoke holding chuck comprising the front and rear sections 13 and 14 secured thereto may be sleeved over the front end of the shaft 17. The projections 33 upon the rear chuck section engage in the channel 32 in the front face of the annular abutment 31. The clamp 26 may then be sleeved over the front end of the front chuck section 13 with its arms embracing the front spokes and contacting with the flange section of the hub shell, after which the washer 28 may be engaged with the pull bar 25 and compressed air admitted to the cylinder 30 to move the piston 29 rearwardly, thereby moving the hub shell and its spoke holding chuck rearwardly to a position determined by the abutment 31 and placing the rear spokes 8 under tension and forcing the shoulders formed by the abutments 11 upon the front spokes firmly against the inner face of the base 9 of the rim member. The ram carrying the holder 18 may then be lowered and during the first portion of the lowering movement the cam 58 moves the die shoe 51 forwardly and with the die shoe the spoke gripping jaws 52 and 53. Then the next portion of the lowering movement brings the cams 64 into wedging engagement with the rolls 65 upon the spoke gripping jaws to thereby spread the inner ends of these jaws and clamp their front ends around a spoke, including its enlargement, after which the riveting punch 20 is brought into contact with the outer end of the tenon of the front spoke to first split and then rivet over the same against the outer face of the base of the rim member. After the riveting, the ram and holder 18 are raised during the first portion of which the cams 64 are carried upwardly out of engagement with the rolls 65 to release the spoke gripping jaws, which latter are then swung to open position by the coil springs 75 and plungers 76. Then the die shoe 51 carrying with it the spoke gripping jaws is moved rearwardly to move the spoke gripping jaws out of the path of both the front and rear spokes. At this time the plunger 49 may be moved away from the index disk 34 and out of engagement with its notch by the plunger 43 engaging the lever 46 and swinging the same against the effort exerted by the coil spring 48. Upon continued upward movement and while the plunger 49 is still held out of engagement with the index disk, the dog 42 engages the shoulder formed by a tooth 37 upon the ratchet disk 36 and rotates this disk, the index disk, the shaft 17 and consequently the wheel assembly to bring the succeeding front spoke into approximate position to be next riveted. Then during the final portion of the upward movement of the ram and holder 18 the plunger 43 becomes disengaged from the lever 46 allowing this lever to return to its normal position to move the plunger 49 toward the index disk and into engagement with the succeeding notch 35, thereby exactly positioning this index disk and through it and the intermediate parts the wheel assembly to exactly position the next front spoke in alignment with the riveting punch 20.

What I claim as my invention is:

1. In a riveting machine for wire wheels, the combination with a base, of a rotatable shaft journaled upon said base, an abutment member mounted upon said shaft and rotatable therewith and having a recess in its front face, a chuck carrying a wheel assembly and having a projection engageable in said recess for rotating the chuck and wheel assembly, means for holding the chuck with its projection engaging in the recess of said abutment, and means for riveting spokes of the wheel assembly to the rim member thereof.

2. In a riveting machine for wire wheels, the combination with a base, of a shaft journaled in said base, an annular abutment mounted upon and rotatable with said shaft and provided with a recess in its front face, a chuck having a driving projection engageable in said recess and carrying a wheel assembly, including front spokes, a draw bar extending through said shaft and a clamp actuated by said draw bar and having arms embracing the front spokes and contacting with the flange section of the wheel assembly hub shell, and reciprocable means for riveting the outer ends of the front spokes to the rim member of the wheel assembly.

3. In a riveting machine for wire wheels, the combination with a base, of a shaft journaled in said base, an abutment member mounted upon and rotatable with said shaft and provided with means for driving a chuck carrying a wheel assembly, a reciprocable member for successively riveting the front spokes of the wheel assembly to the rim member thereof, and means operable in timed relation to said reciprocable member for indexing said shaft, including an index disk and a ratchet disk mounted upon and rotatable with said shaft, reciprocable plungers for engaging said disks, and means for separating said index disk and the plunger in engagement therewith prior to and after engagement of said ratchet disk and the plunger for engagement therewith.

4. In a riveting machine for wire wheels having a hub shell and a rim member, the combination with a base, of a rotatable shaft journaled upon said base, an annular abutment mounted upon and rotatable with said shaft and provided with a recess in its front face, a chuck carrying a wheel assembly and having a driving projection engageable in the recess aforesaid, an automatically actuated clamp operable to hold the hub shell upon the chuck and to also hold the latter with its projection engaging in the recess of said abutment, and means for riveting the spokes of the wheel assembly to the rim member thereof.

5. In a riveting machine for wire wheels having a hub shell and spokes extending therefrom, the combination with a base, of a rotatable shaft journaled upon said base, an annular abutment mounted upon and rotatable with the shaft and provided with a recess in its front face, a chuck engageable within the hub shell and having portions engageable with the inner ends of the spokes to hold the latter from inward movement, a projection upon said chuck adapted to engage in the recess aforesaid for driving the chuck, and an automatically actuated clamp operable to hold the hub shell upon the chuck and to hold the latter with its projection engaging in the recess of said abutment.

6. In a riveting machine for wire wheels having a hub shell and spokes extending therefrom, the combination with a base, of a rotatable shaft journaled upon said base, an abutment mounted upon and rotatable with the shaft, a chuck engageable within the hub shell and having portions engageable with the inner ends of the spokes to hold the latter from inward movement relative to the shell, cooperating interengaging means upon the abutment and chuck for driving the latter from the former, and clamping means operable to hold the hub shell upon the chuck and to maintain the interengaging means aforesaid in driving relation.

In testimony whereof I affix my signature.

WILLIAM N. BOOTH.